United States Patent [19]

Tuka et al.

[11] 4,022,741
[45] May 10, 1977

[54] CONTINUOUS PROCESS FOR THE PREPARATION OF A CATIONICALLY MODIFIED ACRYLAMIDE POLYMER

[75] Inventors: Richard F. Tuka, Oak Lawn; Peter H. Vossos, Lisle; Ralph R. Nielsen, Oak Lawn; Carl J. Guardia, Joliet, all of Ill.

[73] Assignee: Nalco Chemical Company, Oak Brook, Ill.

[22] Filed: Mar. 15, 1976

[21] Appl. No.: 666,982

Related U.S. Application Data

[63] Continuation-in-part of Ser. No. 631,284, Nov. 12, 1975.

[52] U.S. Cl. .................. 260/29.4 UA; 260/72 R
[51] Int. Cl.² .................. C08K 3/00; C08G 12/06; C08F 20/56

[58] Field of Search .......... 260/29.4 UA, 29.4, 851, 260/29.6 WG, 29.6 PT, 29.6 PM, 956, 96 R, 72 R; 526/23, 495 S, 304, 307

[56] References Cited

UNITED STATES PATENTS

| | | | |
|---|---|---|---|
| 2,328,901 | 9/1943 | Grimm et al. | 260/851 |
| 3,323,979 | 6/1967 | Foster et al. | 526/307 X |
| 3,624,019 | 11/1971 | Anderson | 260/29.6 H |

Primary Examiner—Theodore E. Pertilla
Attorney, Agent, or Firm—John G. Premo; Robert A. Miller; Barry W. Sufrin

[57] ABSTRACT

A process for preparing a dilute aqueous solution of a cationically modified polyacrylamide from a water-in-oil emulsion of a finely divided water soluble acrylamide polymer, a secondary amine containing 2 - 4 carbon atoms and formaldehyde is disclosed.

1 Claim, 1 Drawing Figure

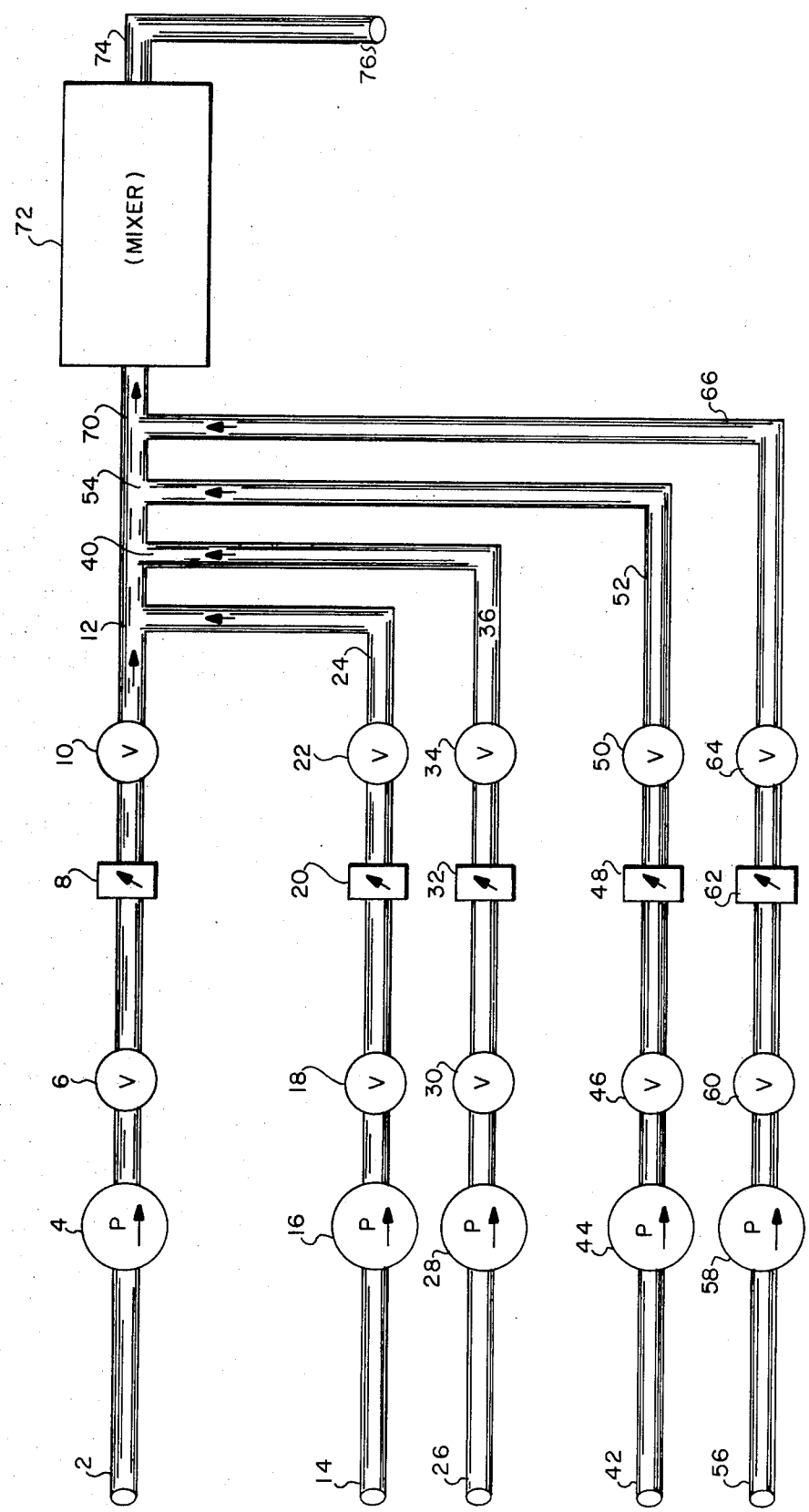

CONTINUOUS PROCESS FOR THE PREPARATION OF A CATIONICALLY MODIFIED ACRYLAMIDE POLYMER

This is a continuation-in-part application of our case Ser. No. 631,284 filed Nov. 12, 1975.

INTRODUCTION

U.S. Pat. No. 2,328,901 teaches the reaction of a secondary amine with formaldehyde and then the reacting of the adduct so formed with a water-soluble polymer acrylamide.

This method of preparing cationically modified acrylamide polymers is old in the art and due to problems associated with forming a secondary amine—formaldehyde adduct, it has not been widely adopted. The adduct formed in this manner is unstable, and several side reactions may occur during this process. Often due to the fact that the premix must be stored for periods of time, storage facilities must be provided for handling this material as well as the initial raw materials. It would, therefore, be an advantage to the art if water soluble cationically modified acrylamide polymer solutions could be prepared without first preparing a premix.

There have also been attempts made to prepare stable water-in-oil emulsions of cationically charged acrylamide polymers; however, problems arise in this respect due to the stability of the material in emulsion form and the stabilizers necessary for inhibiting the reversal of the Mannich reaction when the polymer is present in a concentrated form.

The method of this invention involves the formation of a continuous process stream of water and adding to the continuous process stream a lower alkyl secondary amine containing 2 – 4 carbon atoms, formaldehyde, a water-in-oil emulsion of a finely divided acrylamide polymer and a hydrophilic surfactant capable of inverting the water-in-oil emulsion of the finely divided acrylamide polymer. The continuous process stream is then subjected to turbulent flow in an in-line mixer and a dilute solution of a water soluble cationically modified polyacrylamide is then recovered.

OBJECTS

It is, therefore, an object of this invention to provide an improved method for the preparation of dilute solutions of water soluble cationically modified acrylamide polymers.

Another object of this invention is to provide to the art a method for conveniently preparing dilute solutions of a water soluble cationically modified acrylamide polymer by forming a continuous process stream containing water, a secondary amine, formaldehyde, and a water-in-oil emulsion of a finely divided acrylamide polymer followed by mixing the continuous process stream so as to obtain a water soluble cationically modified acrylamide polymer.

THE INVENTION

This invention relates to a new and improved method for the preparation of a water soluble cationically modified acrylamide polymer by reacting formaldehyde, a lower alkyl secondary amine containing 2 – 4 carbon atoms and a water-in-oil emulsion which contains dispersed therein a finely divided acrylamide polymer in a continuous process stream so as to prepare a dilute solution of a water soluble cationically modified polyacrylamide. The invention is carried out in steps which generally comprise:

A. Forming a continuous process stream containing:
  i. 1.0 – 15.0% by weight of a water soluble lower alkyl secondary amine containing 2 – 4 carbon atoms;
  ii. 0.5 – 4.0% by weight of formaldehyde, said formaldehyde being introduced as an aqueous solution containing from 1 – 40% by weight formaldehyde, the amount of formaldehyde added being in a substantially equal molar ratio to the amount of secondary amine added in i;
  iii. 1.4 – 9% by weight of an acrylamide polymer, said acrylamide polymer being contained in a water-in-oil emulsion which comprises:
    a. An aqueous phase ranging between 30 – 95% by weight of the emulsion said aqueous phase being defined as the sum of polymer and water present;
    b. 20 – 50% by weight finely divided acrylamide polymer;
    c. 5 – 70% by weight of a hydrophobic liquid;
    d. .1 – 21% by weight of a water-in-oil emulsifying agent;
  iv. 0.1 – 2% by weight of a water soluble hydrophilic surfactant capable of inverting the water-in-oil emulsion of iii, and
  v. Water;
B. Subjecting said continuous process stream to turbulent in-line mixing whereby said water-in-oil emulsion of a finely divided acrylamide polymer is inverted, and the reaction of the secondary amine, formaldehyde, and acrylamide polymer with each other is affected; and then,
C. Recovering continuously a 1.0 – 15% aqueous solution of a cationically modified acrylamide polymer.

THE WATER-IN-OIL EMULSION OF ACRYLAMIDE POLYMERS

The water-in-oil emulsions of finely divided acrylamide polymer useful in this invention are stable, yet at the same time contain relatively large amounts of polymer. The polymers dispersed in the emulsion are quite stable when the particle size of the polymer is in the range of 2 millimicrons up to about 5 microns. The preferred particle size is within the range of 5 millimicrons and 3 microns.

The stable water-in-oil emulsion comprises: 1. an aqueous phase; 2. a hydrophobic liquid; and 3. a water-in-oil emulsion emulsifying agent.

The polymer containing emulsion of this invention is comprised of an aqueous phase ranging from between 30 and 95 percent by weight of the emulsion. The aqueous phase is defined as the sum of the polymer or copolymer and the water present in the composition. The preferred range is between 70 and 90 percent by weight of the emulsion. The most preferred range is between 70 and 80 percent by weight of the emulsion.

The polymer concentration of the emulsion ranges between 10 – 50 percent by weight. A preferred range is between 25 and 40 percent by weight of the emulsion. The most preferred range is between 25 and 35 percent by weight of the emulsion.

As seen, based on the weight of the aqueous phase and the percent polymer contained in the aqueous phase, the polymer containing emulsion may contain from 25 – 85% by weight in water.

For the purpose of this invention, the term, acrylamide polymer includes acrylamide homopolymers and copolymers which contain at least 20 percent and preferably 75 percent by weight of acrylamide. The acrylamide polymers most commonly used in the practice of this invention include polyacrylamide and its water-soluble copolymers prepared by polymerizing acrylamide with monomers such as for instance, acrylic acid, methylacrylic acid, itaconic acid, acrylonitrile, dimethylaminomethylmethacrylate. An acrylamide polymer also useful in the practice of this invention is hydrolyzed polyacrylamide which has from 1 - 50 percent of the original carboxamide groups hydrolyzed carboxyl groups. The molecular weights of such polymers and copolymers exceeds 500,000.

The molecular weight of the acrylamide polymers described above may vary over a wide range, e.g., 10,000 to 25 million. The preferred acrylamide polymer has a molecular weight in excess of 500,000.

The organic or oil phase of the emulsion is comprised of an inert hydrophobic liquid. The hydrophobic liquid comprises between 5 and 70 percent by weight of the emulsion. The preferred range is between 5 and 40 percent by weight of the emulsion. The most preferred range is between 20 and 30 percent by weight of the emulsion.

The oils used in preparing these emulsions may be selected from a large group of organic liquids which include liquid hydrocarbons and substituted liquid hydrocarbons. A preferred group of organic liquids are aliphatic hydrocarbon liquids which include blends of aromatic and aliphatic hydrocarbon compounds, which contain from 4 to 8 carbon atoms. Thus, such organic hydrocarbon liquids as benzene, xylene, toluene, mineral oils, kerosenes, naphtha and in certain instances, petroleum, may be used. A particularly useful oil from the standpoint of its physical and chemical properties is the branch-chain isoparaffinic solvent sold by Humble Oil and Refinery Company under the trade name "Isopar M". Typical specifications of this narrow-cut isoparaffinic solvent are set forth below in Table I.

TABLE I

| Specification Properties | Minimum | Maximum | Test Method |
|---|---|---|---|
| Gravity, API at 60/60 ° F. | 48.0 | 51.0 | ASTM D 287 |
| Color, Saybolt | 30 | — | ASTM D 156 |
| Aniline point, ° F. | 185 | — | ASTM D 611 |
| Sulfur, ppm | — | 10 | ASTM D 1266 (Nephelometric mod.) |
| Distillation, ° F. | | | |
| IBP | 400 | 410 | |
| Dry point | — | 495 | |
| Flash point, ° F. (Pensky-Martens closed cup) | 160 | — | ASTM D 93 |

Any conventional water-in-oil emulsifying agent can be used such as sorbitan monostearate, sorbitan monooleate, and the socalled low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. The water-in-oil emulsifying agent is presented in amounts ranging between 0.1 and 21.0% by weight of the emulsion. The preferred range is between 1.0 and 15.0% by weight of the emulsion. The most preferred range is between 1.2 and 10% by weight of the emulsion. It is important that the emulsifying agent selected does not react with the formaldehyde or formaldehyde adduct.

The polymers contemplated for use in this invention maybe synthesized in emulsion form as described in Vanderhoff et al, U.S. Pat. No. 3,284,393 which is hereby incorporated by reference. The polymerization tenchnique set forth in Vanderhoff is generally followed in preparing polymeric latexes used in this invention.

Also contemplated in the practice of this invention is the preparation of suitable water-in-oil emulsions of water-soluble polymers by the methods described in Anderson, et al, U.S. Pat. No. 3,624,019 and U.S. Pat. No. 3,734,873, both of which are hereby incorporated by reference.

The water-in-oil emulsion used in the practice of this invention exhibits the unique ability of rapidly dissolving into aqueous solution. The polymer-containing emulsion releases the polymer in water in the presence of a surfactant in a very short period of time. The inversion technique is described in Anderson, et al, U.S. Pat. No. 3,624,109 and U.S. Pat. No. 3,734,873.

THE SURFACTANTS

The surfactants generally useful to invert the water-in-oil emulsions of the finely divided acrylamide polymers are hydrophilic and are further characterized as being water soluble. Any hydrophilic-type surfactant such as ethoxylated nonyl phenols, ethoxylated nonyl phenol formaldehyde resins, dioctyl esters of sodium sulfosuccinates and octyl phenol polyethoxy ethanols may be used. These surfactants and others are fully described in U.S. Pat. No. 3,624,019 which is hereinafter incorporated by reference into this application. A preferred class of surfactants useful in the practice of our invention are ethoxylated nonyl phenols.

While the surfactants necessary for the inversion of the latex polymer may be added to the process stream separately, it may also be combined in solution with either the secondary amine, formaldehyde, or the water-in-oil emulsion of the finely divided acrylamide polymer itself. When the surfactant is added to the water-in-oil emulsion, care must be taken to prevent the inversion of the water-in-oil emulsion prior to being added to the process stream. In cases where the surfactant is added to the water-in-oil emulsion, the emulsion is rendered self-inverting upon contact with the water in the continuous process stream.

THE FORMALDEHYDE SOLUTIONS

The formaldehyde solutions useful in our invention for the preparation of the water soluble cationically modified acylamide polymer generally contain from 10 – 50% formaldehyde and preferably from 20 – 40% formaldehyde. These solutions are commercially available and need not be elaborated on. Additionally, it is within the scope of our invention to dissolve paraformaldehyde in water to produce a formaldehyde solution suitable for use in our invention.

THE SECONDARY AMINES

The preferred secondary amine used to prepare the cationically modified water soluble acrylamide polymer within the scope of our invention is dimethylamine. However, other secondary amines such as N,N-methyl ethyl amine and diethylamine which are water soluble and which are generally characterized as lower alkyl secondary amines may be employed. Typically, these secondary amines will contain from 2 – 4 carbon atoms. With the preferred secondary amine of our invention dimethylamine, aqueous solutions are generally available commercially ranging from 15 – 60% by weight. It is often expedient within the course of our invention to use as concentrated an aqueous solution as feasible due to the fact that less storage facilities are necessary.

Since the process stream of this invention can be formed by the addition of the water-in-oil emulsion of the finely divided acrylamide polymer, formaldehyde, and secondary amine in any order, the invention will be described in terms of water and reactants. These reactants include the water-in-oil emulsion, formaldehyde, lower alkyl secondary amine, and the hydrophilic surfactant used to cause the inversion of the water-in-oil emulsion. The order of addition of the reactants to the continuous process stream of water is not critical and it will be seen by those familiar with the art that the final product obtained will be the same regardless of addition order. It should be pointed out that while the hydrophilic surfactant has been listed as one of the reactants, it may be incorporated readily into one of the other reactants as described above.

THE PROCESS

The method of our invention for the preparation of a dilute aqueous solution of a cationically modified acrylamide polymer generally involves in-line mixing of the various ingredients together followed by storing the finished product.

DESCRIPTION OF THE DRAWING

FIG. 1 shows a flow sheet describing the process of our invention.

By reference to the drawing, the invention can be described as follows:

Water from a source not shown is directed through pipe 2, passing through pump 4, control valve 6, flow meter 8 and valve 10. Flow meter 8 indicates the flow of water being pumped by pump 4 with valves 6 and 10 being used to regulate the flow. A second reactant from storage tanks not shown is directed into line 14 and passes through pump 16, valve 18, flow meter 20 and valve 22. Valves 18 and 22 are used to regulate the flow in conjunction with flow meter 20. Upon exiting valve 22, the second reactant flows into line 24 and contacts the water contained in line 2 at point 12.

A third reactant from storage tanks not shown enters line 26 and passes through pump 28, valve 30, flow meter 32 and valve 34 exiting into line 36. Valve 30, flow meter 32 and valve 34 are used to regulate the flow of third reactant being pumped by pump 28. From line 36, the third reactant contacts the aqueous process stream containing the second reactant and water at point 40.

A fourth reactant from storage tanks not shown enters line 42 and passes through pump 44, valve 46, flow meter 48 and valve 50 exiting into line 52. Valves 46 and 50 are used to regulate the flow from pump 44 and are used in conjunction with flow meter 48. From line 52, the fourth reactant contacts the aqueous process stream containing the second and third reactants and water at point 54.

The fifth reactant from storage tanks not shown is directed to line 56 where it passes through pump 58, valve 60, flow meter 62 and valve 64 into lines 66. Valves 60 and 64 are used in conjunction with flow meter 62 to regulate the flow of the fifth reactant being pumped by pump 58. From line 66, the fifth reactant enters the aqueous process stream containing the second, third and fourth reactants.

The continuous process stream immediately after passing point 70 is directed through mixer 72. This mixer serves the function of causing the inversion of the water-in-oil emulsion of the finely divided acrylamide polymer and initiates the reaction between the polymer contained within the water-in-oil emulsion and the other reactants. The aqueous process stream exits from the mixer through line 74 and the aqueous solution of a cationically modified acrylamide polymer so formed is passed through point 76 to storage or drumming facilities not shown.

DETAILED DESCRIPTION OF THE INVENTION

The lower alkyl aliphatic secondary amine useful in our invention is added to the aqueous process stream in an amount sufficient to prepare an aqueous process stream containing 1.0 – 15% by weight of the secondary amine at either point 12, 40, 54 or 70. Generally, it is a preferred embodiment of our invention to add a slight molar excess of the secondary amine to the formaldehyde added at a later step. This excess is generally present at a 1 – 10% molar level and its purpose is to inhibit cross-linking of the resultant polymer by formaldehyde during storage of the final product.

The water soluble surfactant capable of inverting of the water-in-oil emulsion is added to the aqueous continuous process stream at either point 12, 40, 54 or 70. This surfactant must be water soluble, and types of surfactants useful in this application are generally described in Anderson, et al, U.S. Pat. No. 3,624,019 and U.S. Pat. No. 3,734,873. A particularly useful class of surfactants are ethoxylated nonyl phenols such as Triton X-114, a commercially available surfactant from the Rohm Hass Company.

As stated above, the surfactant should be present in the system at a level of from .1 – 2% by weight and as discussed above may be included in the water-in-oil emulsion. This is to insure that the water-in-oil emulsion to be added at a later point downstream will successful invert when being mixed with the other reactants.

The formaldehyde added to the system at point 12, 40, 54 or 70 is added as an aqueous solution, generally ranging from 10 – 40% by weight. Preferably, the formaldehyde is used in as concentrated a form as possible so as to eliminate storage problems and it is preferred to use formaldehyde solutions containing from 35 – 40% by weight formaldehyde. As exemplary of the process, when adding the formaldehye at point 54, valve 46 is adjusted by the indications of flow meter 48 to provide a molar ratio of formaldehyde to secondary amine of from 1.0:1.0 to 1.0:1.1.

The finely divided water-in-oil emulsion of water soluble acrylamide polymer is again treated in much the same way and is added to the aqueous process stream at point 12, 40, 54 or 70 in a molar ratio of amide functionality present on the acrylamide polymer to formaldehyde added or to be added of preferably from 9.0:1 to 1.0:0.9.

It should be noted that in the process of our invention a cationically modified acrylamide polymer having a known degree of cationicity can be prepared by reacting more or less of the dimethylamine and the formaldehyde with the acrylamide. That is, for example a cationic polymer having any degree of cationicity from 0 to 100% can be prepared by varying the amount of the formaldehyde added to the amount of amide functionality present.

It should be taken into account, however, that sufficient acrylamide polymer should be added, and the process as a whole should be operated at a level whereby the final product exiting from point 76 will have a controlled viscosity. This will depend on the molecular weight of the particular acrylamide polymer employed, a greater viscosity being present for greater molecular weights at an equivalent concentration. From point 70 the continuous aqueous process stream is passed through mixer 72.

The mixers employed in the course of our invention may be any number of types. These would include screw type mixers; injector mixers, see for example U.S. Pat. No. 2,531,547; orific and nozzle mixers, jet mixers, agitated line mixers, see for example U.S. Pat. No. 2,183,859; and mixers of the type generally known as Kenics. In the course of our invention we generally prefer to use a Kenics type mixer. These mixers are generally described in U.S. Pat. Nos. 3,286,992; 3,297,305; 3,664,638; and 3,704,006. The operational parameters of these mixers will generally depend on the rate of flow being passed through them, and parameters of this sort can be readily determined by those skilled in the field of chemical engineering.

After passing through mixer 72, a water soluble cationically modified acrylamide polymer containing from 1.0 – 15% solids is formed. The temperature of the process stream may be held at from 15° –50° C, the higher temperature causing a much quicker reaction of the inverted acrylamide polymer with the secondary amine and formaldehyde.

It is important within our invention that some means of controlling the flow of the reactants into the system is employed. Valves 6, 18, 30, 46 and 60 regulate the flow of reactants into the continuous process stream, the valves being set by the flow indicated on flow meters 8, 20, 32, 48 and 62. Valves 10, 22, 34, 50 and 64 are present as auxiliary control devices and as a means for shutting off one or more lines completely in the event cleaning is necessary. The flow meters employed can be set to read in any convenient manner; however, gallons or liters per minute is preferred due to the ease at which concentration of the reactants being fed into the system can be determined.

When the water soluble hydrophilic surfactant is incorporated into the water-in-oil emulsion of the finely divided acrylamide polymer, one addition point described above will be unnecessary. It should be stated that the number of addition points in this invention is not critical so long as the reactants are introduced into the system in any form to prepare the cationically modified acrylamide polymer. Exemplary is the fact that the order of addition is not critical for the water-in-oil emulsion of the finely divided acrylamide polymer, this emulsion being added to the process stream containing water either first or last or in the middle so long as it is present in the process stream prior to its passage through the mixer.

The finished aqueous solution of a water soluble cationically modified acrylamide polymer produced in accordance with our invention will remain stable during storage over a time period of several weeks. With the use of our process and its relative simplicity, the system can be installed at the end-user's location to produce the polymer if necessary. In addition, the polymer produced in accordance with our invention may often not reach full activity (i.e. cationic charge) for a period of 4 – 20 hours, so a holding time before use may be necessary.

In order to illustrate our invention but not to limit it, the following example is presented:

To a system generally as described in FIG. 1, a flow of water would be established at 10.0 gallons per minute. To this flow of water would be added at a first point downstream a flow of 6056.5 grams per minute of a 60% aqueous solution of dimethylamine. This would establish a concentration of dimethylamine of 8.25%. To a second point downstream of the first point downstream would then be added 439.1 grams per minute of ethoxylated nonyl phenol type surfactant such as Triton X-114.

To a third point downstream of the point where the surfactant is added would be added 6220.2 grams per minute of an aqueous solution containing 37% formaldehyde. This would provide a 5% molar excess of dimethylamine over the formaldehyde, 80.75 moles per minute being introduced in comparison to 76.715 moles of formaldehyde per minute. At a fourth point downstream from the point where the formaldehyde was added, would then be added 21,444 grams of a water-in-oil emulsion of polyacrylamide containing 25.4% polymer and having an intrinsic viscosity of 8.5. This would provide a 1:1 molar ratio of polymer to the formaldehyde present in the aqueous process stream.

The aqueous process stream would then be passed through a Kenics mixer having a 4 ft. length and being operated at a temperature of 25° C. During the passage of the aqueous process stream through the mixer, the water-in-oil emulsion would invert creating a dilute aqueous solution of polyacrylamide. This polyacrylamide would then be reacted within the mixer with the dimethylamine and formaldehyde so that on exiting the mixer, the dilute aqueous solution would contain 10.6% by weight of a N,N-dimethylaminomethyl substituted polyacrylamide. This material would then be directed to storage or drums. This polymer so produced would have a high cationic charge value as determined by colloidal titration and would be useful in the area of paper retention and the dewatering of industrial and municipal wastes.

While the above example discloses one order of addition of the reactants into the continuous process stream, it will be seen that other orders of addition are also within the scope of this invention and that the above example is not meant to be limiting.

We claim:

1. A process for the preparation of a dilute aqueous solution of a cationically modified polyacrylamide from a water-in-oil emulsion of a finely divided water soluble acrylamide polymer said process comprising:
    A. Forming a continuous process stream containing:
        i. 1.0 – 15.0% by weight of a water soluble lower alkyl secondary amine containing 2 – 4 carbon atoms;
        ii. 0.5 – 4.0% by weight of formaldehyde, said formaldehyde being introduced as an aqueous solution containing from 1 – 40% by weight formaldehyde, the amount of formaldehyde added being further characterized as being in a substantially equal molar ratio to the amount of secondary amine added in i;

iii. 1.4 – 9% by weight of an acrylamide polymer, said acrylamide polymer being contained in a water-in-oil emulsion which comprises:
  a. An aqueous phase ranging between 30 – 95% by weight of the emulsion, said aqueous phase being defined as the sum of polymer and water present;
  b. 20 – 50% by weight finely divided acrylamide polymer;
  c. 5 – 70% by weight of a hydrophobic liquid;
  d. .1 – 21% by weight of a water-in-oil emulsifying agent;
  iv. .1 – 2% by weight of a water soluble hydrophilic surfactant capable of inverting the water-in-oil emulsion of iii; and,
  v. Water;
B. Subjecting said continuous process stream to turbulent in-line mixing whereby said water-in-oil emulsion of a finely divided acrylamide polymer is inverted, and the reaction of the secondary amine formaldehyde, and acrylamide polymer with each other is affected; and then,
C. Recovering continuously a 1.0 – 15% aqueous solution of a cationically modified acrylamide polymer.

* * * * *

Disclaimer 4,022,741.—*Richard F. Tuka*, Oak Lawn, *Peter H. Vossos*, Lisle, *Ralph R. Nielsen*, Oak Lawn, and *Carl J. Guardia*, Joliet, Ill. CONTINUOUS PROCESS FOR THE PREPARATION OF A CATIONICALLY MODIFIED ACRYLAMIDE POLYMER. Patent dated May 10, 1977. Disclaimer filed May 23, 1977, by the assignee, *Nalco Chemical Company*.

The term of this patent subsequent to May 3, 1994, has been disclaimed.
[*Official Gazette August 2, 1977.*]